June 10, 1952    F. L. LE BUS    2,599,926
DRUM WINDING APPARATUS

Filed Dec. 23, 1949    2 SHEETS—SHEET 1

INVENTOR.
F. L. LeBus
BY
C. M. McKnight

June 10, 1952     F. L. LE BUS     2,599,926
DRUM WINDING APPARATUS

Filed Dec. 23, 1949     2 SHEETS—SHEET 2

INVENTOR.
F. L. LeBus
BY
C. M. McKnight

Patented June 10, 1952

2,599,926

UNITED STATES PATENT OFFICE 2,599,926

DRUM WINDING APPARATUS

Franklin L. Le Bus, Longview, Tex.

Application December 23, 1949, Serial No. 134,741

4 Claims. (Cl. 242—117)

This invention relates to a cable or rope winding apparatus, and more particularly, but not by way of limitation, to a method of assembling cable guides on a rotary spool for winding cable in a true line thereon.

At the present time there are substantially two methods of adapting a spool or drum so that a cable will wind onto the spool in a true line as the spool is rotated. The first method is by cutting grooves in the outer surface of the spool core by a lathe or the like. This has proven economically unsatisfactory due to the many different sizes of cables that may be used on the same drum, and a drum adapted in this manner for use with a particular size of cable cannot be satisfactorily used with a cable of a different diameter. Another method is by casting the grooves in the outer surface of the spool core when the spool is manufactured. In addition to the detriments stated above to the grooves being cut in the core, this method is not satisfactory because the cores are frequently cast slightly out of round; therefore, as this type of spool is rotated, excessive vibrations will frequently occur to materially shorten the life of the bearings supporting the spool. A great number of the spools or drums are, however, manufactured and used with a smooth core, which will wind the cable onto the core unevenly, causing the cable to chafe or tear the cable strands which materially shortens the life thereof.

This invention generally contemplates the method of use of preforming arcuate guide sections which are attached on a cable or rope receiving drum in such a manner that they will provide for even or true winding of the cable onto the drum. Furthermore, the preforming guide sections are attached on the drum in such a manner that they may be readily removed therefrom when it is desired to use the drum with variable sized cable. This invention is an improvement over the patents issued G. F. Le Bus, Nos. 2,204,938 and 2,216,819, issued on June 18, 1940, and October 8, 1940, respectively.

It is an important object of this invention to provide an economical method of adapting a smooth cored spool or drum for use with several different sizes of cables or ropes.

Another object of this invention is to provide winding guides for cable receiving spools whereby the cable may be wound onto the spool in a true line as the spool is rotated, thereby materially increasing the life of the cable by preventing chafing caused by one portion of the cable rubbing against another portion thereof.

And another object of this invention is to provide a simple and economical method of installing removable winding guides on the core of a winding spool whereby the guides may be placed on any length core and cause the cross-over from one layer to the next successive layer to be placed in a predetermined and true position.

Other objects and advantages of the invention will be evident from the following detailed description, read in conjunction with the accompanying drawings, which illustrate my invention.

Figure 3:
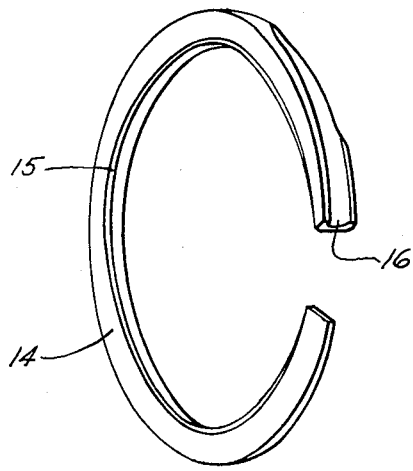
Figure 3 is a perspective view of the opposite end filler.

Referring to the drawings in detail, reference character 2 designates a drum or spool generally having a cylindrical shaped core 4 communicating with a hub 6 at one end thereof and a hub 8 at the opposite end thereof. The hub 8 is provided with an aperture 10 in its inner flange 9. Disposed on the core 4 and adjacent to the hub 8 is an arcuate starting end filler 12 (Figs. 1 and 2) of uniformly varying thickness from one end to the other and provided with a chamfered portion 13 between the inner periphery and the outer face thereof. Disposed on core 4 at the opposite end thereof adjacent hub 6 is a similar arcuate end filler 14 of uniformly varying thickness (Fig. 3) from one end to the other provided with a biased arcuate groove 16 of varying depth in the outer periphery thereof extending from the thicker end to a point intermediate the ends thereof. The filler 14 is provided with a chamfered portion 15 between the inner periphery and the outer face thereof. Although end fillers 12 and 14 are illustrated as unitary structures, it is to be understood that they may be composed of arcuate sections to facilitate their installation on the drum 2. Encircling core 4 between end fillers 12 and 14 is a plurality of preformed groove guide sections 18 placed end to end to form a continuous helical groove.

Figure 1:
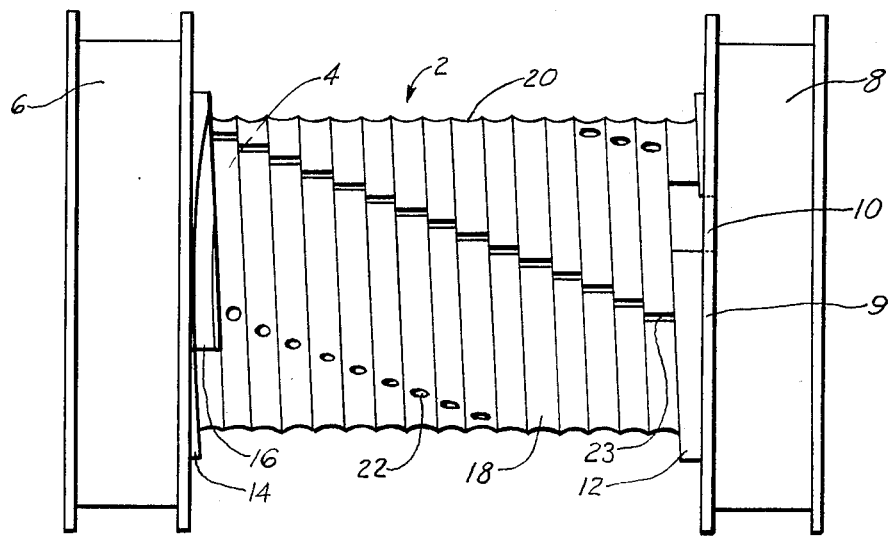
Figure 1 is a side elevational view of a spool provided with winding guides.
Figure 2:
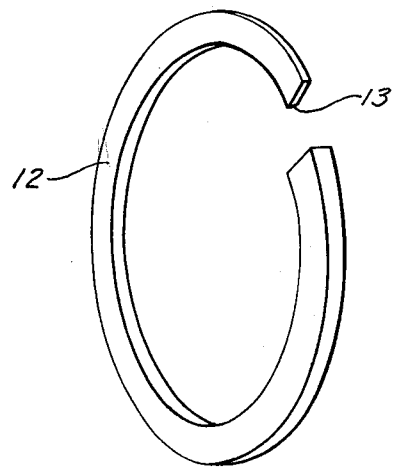
Figure 2 is a perspective view of a starting end filler for the spool.
Figure 5:
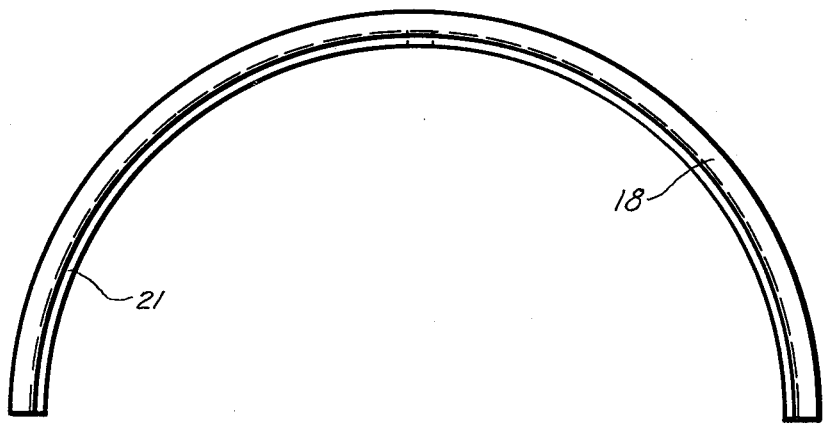
Figure 5 is a side elevational view of a preformed guide section.
Figure 4:
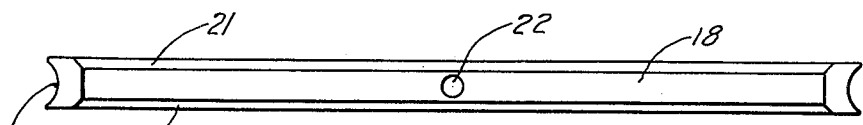
Figure 4 is a bottom view of the guide sections.

Each guide 18 is preferably semi-circular, although it may be of shorter length, and is provided with an arcuate groove 20 on the outer periphery; a chamfered portion 21 on both sides of the inner periphery and a transverse aperture 22 approximately half-way between the ends thereof. Apertures 22 may be used to weld the guides 18 to the core 4 or may be adapted to receive threaded studs for attaching the guides to the core 4. Shims or spacers 24 may be placed between the lateral edges of the guides 18 for purposes as will be hereinafter set forth. In assembling the apparatus, the filler 12 is placed on the core 4 with the ends thereof on the opposite sides of aperture 10 as illustrated in Figure 1, and then welded in position to core 4 or hub 8. The filler 14 is then placed and secured on the opposite end of core 4 in a predetermined angular position relative to filler 12, depending upon the size of spool and cable used in order to obtain the desired cross-over from each layer of cable to the next successive layer. The length of the core 4 and the width of guides 18 and spacers 24 being a known quantity, it may be readily determined whether spacers 24 will be required, and how many. It is desirable to determine the number of spacers 24 required prior to welding the guides 18 to the core 4, in order to distribute the space required to be compensated over the entire length of the core, and thus preclude any unusual clearance between the guide sections, yet assure a substantially correct installation on the core 4. The first arcuately shaped guide 18 is secured to core 4 adjacent filler 12 with one end thereof in proximity with aperture 10 as illustrated in Figure 1. The next guide 18 is then secured to core 4 adjacent filler 12 with one end thereof in line with and in slightly spaced relation, as at 23, to the trailing end of the first guide 18. Each succeeding guide 18 is secured to core 4 in a similar manner with spacers 24 being added between the guides as they are placed in position.

Figure 6:
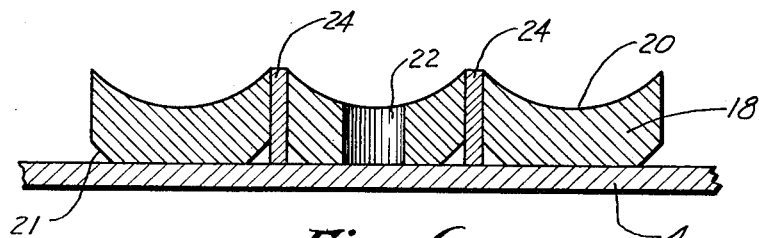
Figure 6 is a sectional detail illustrating the position of three guide sections on a drum core.

The spacing portions 23 of the arcuate guide sections at the ends thereof, is to provide sufficient clearance for securing by welding or the like, the plurality of guide sections 18, in addition to any attachment through the apertures 22. It will be apparent from Figure 6 that the guide sections 18 may also be welded to the core 4 in the clearance between the chamfered portions 21, and the outer periphery of the core. The variable lengths of the arcuate sections provide for a variable point of attachment as is clearly shown in Figure 1; and consequently, precludes any unusual or concentrated stress on the drum as would be affected by a straight line transverse welding.

In the event the trailing end of the last full size guide 18 does not fall in proximity with the grooved end 16 of filler 14, another arcuate guide 18 may be cut to the desired length and inserted therein for filling the hiatus. As illustrated in Figure 1, the varying thickness of filler 12 causes each guide 18 to be disposed at a predetermined oblique angle on core 4, thereby forming a continuous helical groove, and is in conformity with the opposite filler 14.

Operation

In operation, the free end of a cable or rope (not shown) is inserted from the inner side of hub 8 through aperture 10 and secured therein by a suitable clamp or the like (not shown). Tension is then placed on the cable, and the spool 2 is rotated in a counter-clockwise direction (referring to the outer face of hub 8) and the cable is wound onto core 4 in the helical grooves formed by the guides 18. As the cable approaches hub 6, it comes into contact with groove 16 in the opposite end filler 14, and is directed thereby in a reverse helical course to form a second layer of wound cable. As the cable, upon substantial completion of the second layer, comes into contact with the inner face of filler 12, it is caused to again move in a reverse direction conforming to the helical groove formed by the guide 18 to provide a third layer of wound cable. It is to be noted that end fillers 12 and 14, in addition to directing the crossovers for the wound cable, also prevents the cable from rubbing against the inner faces of hubs 6 and 8 and prevents an open space from occurring between that portion of the cable adjacent the inner face of hubs 6 and 8 into which a portion of the cable from the layer above could slip into and foul the cable as it is withdrawn from the spool. In addition to the above, the guides 18 control the space between the successive loops of the cable to prevent the loops forming the second layer from becoming entangled with the loops of the first layer.

From the foregoing, it will be apparent that the present invention provides for the utilization of a plurality of preformed arcuate guide sections adapted to be attached to the smooth core of a cable winding spool, and the method of attaching the preformed section is such that the sections are secured to the drum to efficiently wind the size of cable in a true line. Furthermore, when a different size cable is to be wound on the drum, the preformed sections can easily be removed at the welded portions to permit attachment of different sized guides thereon. The use of the shims properly space the preformed segments in cooperation with the end fillers for a true winding of the cable on the drum, without any possibility of slots or perforations between the end hubs of the drum which would cause chafing or unthreading of the cable threads. Furthermore, the end fillers cooperate with the arcuately guide sections in such a manner to provide accurate cross-over of the cable for the super-imposed layers without any distortion.

The guide sections 18 may also be called cable seats.

Changes may be made in the combination and arrangement of parts heretofore set forth in the specification and shown in the drawings, it being understood that any modification in the precise embodiment of the invention may be made within the scope of the following claims without departing from the spirit of the invention.

I claim:

1. A cable winding device for use on a rotating drum core comprising preformed grooved guide sections arranged in end to end spaced relation on the outer periphery of said drum core to provide a continuous helical groove, arcuate end fillers on the opposite ends of said drum core in communication with said guide sections to direct the cross-overs of a cable adapted to be wound on said guide sections, means to secure said guide sections and said end fillers on said drum core, and spacer means disposed between said guide sections for predetermining correct sizing.

2. In a cable winding apparatus comprising a rotating drum core, a helically disposed arcuately shaped starting end filler provided at one end of the drum, a helically disposed second end filler at the opposite end of the drum, a plurality of arcuately shaped grooved cable seats attached in successive end to end relationship between the end fillers, an aperture in each of the cable seats to facilitate the attachment thereof to the drum core, and spacer means provided between the successive cable seats to provide for proper distribution of the seats relative to the length of the core.

3. In a cable winding apparatus comprising a rotating drum core, a helically disposed arcuately shaped starting end filler provided at one end of the drum, a helically disposed second end filler at the opposite end of the drum, a plurality of arcuately shaped grooved cable seats attached in successive end to end relationship between the end fillers, an aperture in each of the cable seats to facilitate the attachment thereof to the drum core, and spacer means provided between the successive cable seats to provide for proper distribution of the seats relative to the length of the core, said cable seats having chamfered side portions to provide for additional attachment to the core.

4. In a cable winding apparatus, comprising a hoisting drum having opposite end hubs, a cable cross-over end filler helically disposed adjacent each hub member, a plurality of preformed arcuately shaped grooved guide sections removably secured in successive end to end relationship between the end fillers, and spacer means provided between the guide sections to dispose the sections relative to the length of the drum for correct alignment between the end fillers.

FRANKLIN L. LE BUS.

REFERENCES CITED

The following references are of record in the file of this patent:

UNITED STATES PATENTS

| Number | Name | Date |
|---|---|---|
| 2,093,810 | Karmazin | Sept. 21, 1937 |
| 2,204,938 | Le Bus | June 18, 1940 |
| 2,216,819 | Le Bus | Oct. 8, 1940 |

FOREIGN PATENTS

| Number | Country | Date |
|---|---|---|
| 666,876 | Germany | Oct. 29, 1938 |